Figure 1:
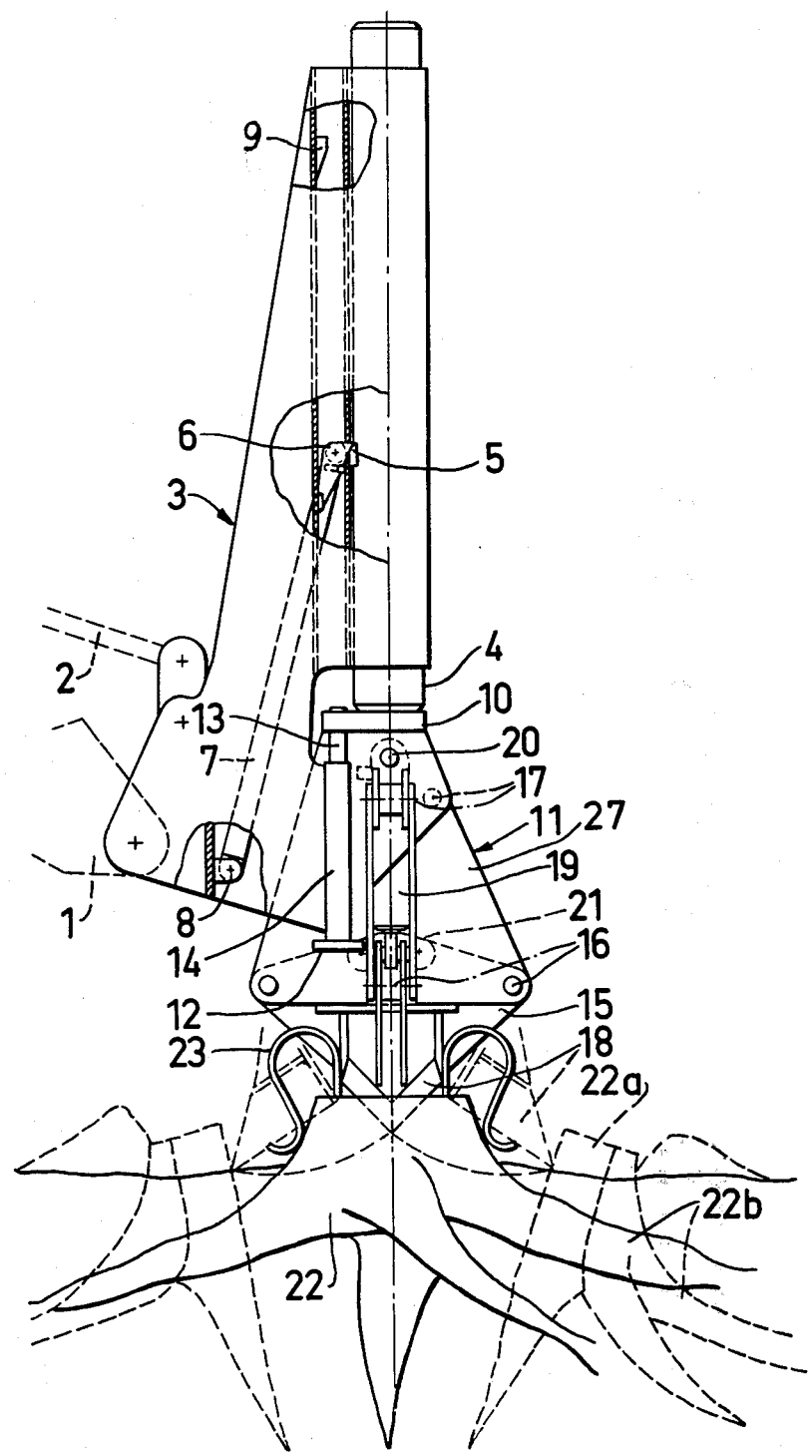

United States Patent [19]

Forslund

[11] 4,048,733
[45] Sept. 20, 1977

[54] DEVICE FOR USE IN REMOVAL OF STUMPS

[75] Inventor: Erik Torsten Forslund, Alfta, Sweden

[73] Assignee: Ostbergs Fabriks AB, Alfta, Sweden

[21] Appl. No.: 728,286

[22] Filed: Sept. 30, 1976

[30] Foreign Application Priority Data

Oct. 1, 1975 Sweden .................................. 7511007

[51] Int. Cl.² ............................................ A01B 13/00
[52] U.S. Cl. .................................... 37/2 R; 144/34 A
[58] Field of Search ................... 37/2 R, 2 P; 83/658, 83/928; 144/34 A

[56] References Cited

U.S. PATENT DOCUMENTS

| 156,101 | 10/1874 | Reyner | 37/2 R |
|---|---|---|---|
| 234,357 | 11/1880 | Watson | 37/2 R |
| 1,313,709 | 8/1919 | McKoy | 37/2 R |
| 3,989,075 | 11/1976 | Coughran, Jr. | 37/2 R |

FOREIGN PATENT DOCUMENTS

| 672,906 | 10/1964 | Italy | 37/2 R |
|---|---|---|---|
| 397,172 | 3/1972 | U.S.S.R. | 37/2 R |
| 304,909 | 7/1971 | U.S.S.R. | 37/2 R |
| 282,799 | 8/1969 | U.S.S.R. | 37/2 R |
| 324,024 | 2/1972 | U.S.S.R. | 37/2 R |
| 247,695 | 11/1969 | U.S.S.R. | 37/2 R |

*Primary Examiner*—E.H. Eickholt
*Attorney, Agent, or Firm*—Pierce, Scheffler & Parker

[57] ABSTRACT

At the end of a vehicle-carried crane arm a vertically extending frame is supported which at its lower end carries a movable split head with spreadable chopping blades. A ram raisable to the top of the frame drives, when released, by the impact on the split head the blades into the center of a tree stump that is to be extracted from the earth. Then the blades are spread to break the stump into separate portions which are easily individually removable in a direction substantially following the extension of the roots.

7 Claims, 2 Drawing Figures

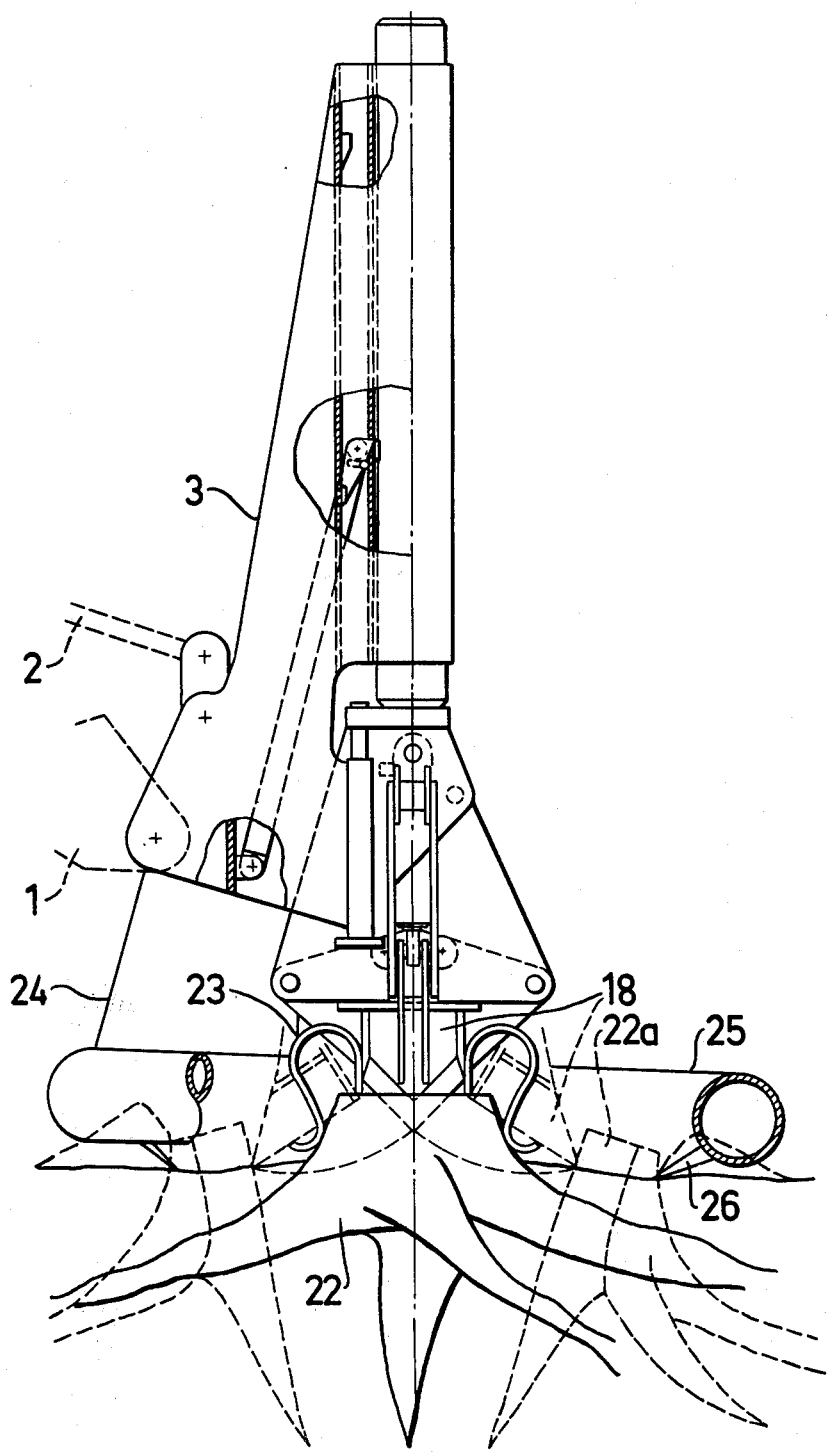

DEVICE FOR USE IN REMOVAL OF STUMPS

The present invention refers to a device for use in removal of stumps.

It is considered that only about 40% of a tree can be made useful as wooden goods whereas the rest - top, branches and stump — only can be used for pulp production. Of said rest the stumps represent a not unconsiderable part, close to 20%.

For the removal of stumps it has been considered to be rational to replace the manual handling by a mechinal pulling-up of the stumps. This, however, has the disadvantage of tearing out big holes when the stump along with its roots is pulled up, and the force required amounts in normal cases up to the order of 25 tons. This means, on one hand, an extensive work for soil scarification — for restoring the milieu or making a new planting on the stump spot as the case may be — and, on the other hand, the use of very bulky and expensive stumpers. Further, the breaking of the stump usually accompanying the removal operation of stumpers, leads to a crushing of fibres and, thus, forming of splinters in the chipping operation, which is a severe drawback in pulp production.

These and other disadvantages are eliminated by the improvement according to the invention that in a freely supported frame an energy storer, as a ram, raisable up to a starting point, is guided to produce an impact on a split head movably connected with the frame, in the lower end of said split head chopping blades are mounted symmetrically with respect to the axis of the energy storer and movable between a collected and a radially spread position and intended to be driven down, by the energy storer, into the centre area of a stump and then to be spread to break said stump into separate portions, which are easily removable in a direction substantially following the extension of the roots.

The invention is described in more detail in the following while referring to the accompanying drawings, where FIG. 1 is a schematic elevation view of the stump removal device in two working steps when operating in a relatively compact ground, and FIG. 2 shows the same arrangement as in FIG. 1 but supplemented with additional means for operating in soft grounds.

At 1 is shown in phantom the end of a crane beam or the like for free support of a frame 3, and at 2 a control rod for adjusting the tilting of the frame. The frame 3 has, in the embodiment shown, a guide channel for a ram 4 in the form of an elongated iron cylinder. This cylinder has a recess forming a shoulder 5 engaging a bill-shaped member 6 movably mounted at the end of the piston rod of a hydraulic jack 7 pivoted at a point 8 on the base of the frame. By means of the hydraulic jack the ram 4 can be raised up to a starting point, for which the shoulder 5 reaches the level of a triggering knob 9 of the frame. Then this knob exerts a pressure against a backwardly extending portion of the bill member 6 so it is rotated out of engagement with the ram, said ram then falling down onto the thrust plate 10 of a split head, generally designated with numeral 11.

Between the thrust plate 10 and a protrusion 12 of the split head a vertical bar 13 is fixed which extends through a tube 14 of a shorter length than that of the bar and fixed to the base of the frame 3. Thus, the split head 11 is glidably supported by the frame 3. By means of returning force the head is lifted with its protrusion 12 into contact with the lower end of the tube 14 so that the head is given a length of stroke between the thrust plate 10 and the upper end of the tube 14, as shown in the figure.

At the bottom of the split head 11, generally of the frustro pyramidal shape, respective first apices of four triangular swing members 15 are pivoted at points 16 in respective triangular plates 27 of the split head. In the position shown in the figure the four swing members form a cross. The triangular plates 27 are, in their turn, at their upper apices pivoted at points 17 on the split head. A second and lower apex of each swing member is terminated by a chopping blade 18 having a right-angled transverse section. In the position shown the angle corner lines of the chopping blades are close to each other so that also the blades form a cross having its centre in the axis of the ram 4. Preferably, the blades are pointed, as shown in the figure.

A vertically extending hydraulic jack 19 has its jack end pivoted at a point 20 on the axis of the ram 4 and terminates with the end of its piston rod in a cross link 21, the four arms of which have their ends pivoted at the respective third apices of the triangular swing members 15. Thus, when the hydraulic jack 19 is expanding, the swing members with associated chopping blades are rotated radially outwards.

The operation of the arrangement described above is as follows:

The ram 4 is centered over a stump 22. The centering can be facilitated by means of resilient supporting means or arms 23 which are fixed at the back side of the respective chopping blades and serve to grip the periphery of the stump.

By means of the hydraulic jack 7 the ram 4 is elevated up to the knob 9 which releases the downfall of the ram towards the thrust plate 10 of the split head 11. The bar 13 transfers the thrust energy developed by the impact directly to the chopping blades 18 without subjecting the hitherto inactive hydraulic jack 19 and its bearings to strain. The chopping blades 18 are sinked into the center are a of the stump 22 to a depth corresponding to the strike length of the split head, whereby radial cracks are produced. Then the hydraulic jack 19 is expended to rotate the chopping blades outwards so that they break up the stump into separate parts 22a which are urged radially outwards, as shown by dashed lines in FIG. 1; the play in the horizontal distance between the pivot points of the cross link 21 and the pivot points 16 of the swing members 15, respectively, is accommodated by the oscillation of the plates 27 around the point 17. After this breaking up of the stump - in this case into four parts - and the loosening of the root paths and also the breaking of the root-fibres, produced by the radial pressing outwards of the roots 22b the remaining extraction of the stump parts in the general direction of the roots does not offer any problems but can be effected with a surprisingly modest force.

FIG. 2 shows the same arrangement as FIG. 1 but supplemented with a collecting ring 25 fixed to the frame 3 by means of a supported 24 and having edges 26 inclined in an inwards and downwards direction. The edges serve to, when operating in soft grounds, as pine fine sand, heaths and the like, clamp the stump parts 22a against the edges of the chopping blades 18 in their swung-out position, whereby the stump parts along with their roots can be pulled out by raising the whole frame at 1 and 2 by the crane beam.

The advantages of the invention can be summarized as follows:

1. Highly reduced power requirements as compared with priorly known methods for removal of stumps — only a fraction of the earlier required power.
2. The parts of the stump are automatically freed from small roots and root systems. Rough cleansing from earth, gravel and stone is better than with known methods. The parts of the stump are so loosened in the ground that they can easily be collected, adjusted, shaken and cleansed by a minor type of forwarder.
3. Removed parts of the stump are substantially free from fibre-crushing.
4. The disturbance of the milieu is at a minimum as peat and earth cover only are teared up in a limited degree. The earth masses positioned below the stump and in root systems are sheared off in an astonishingly high degree by the urging of the parts of the stump from the centre towards the periphery. When the parts of the stump are pulled out the earth released from the root legs are very finely distributed over the hole left by the bulky mass of the stump.
5. As to the soil scarification, point 4 results into fine blanks for planting. If additional blanks are desired beyond those obtained after the removal of stumps, these additional blanks can readily be produced by "blind splitting."

The invention is not restricted to the embodiment described and shown in the drawings. To one skilled in the art it is obvious that the ram may be replaced or supplemented by another means of accumulating energy, as for example a compression or expansion of springs. Instead of hydraulic jacks manually operated aggregates could principally be used. The number of symmetrically positioned chopping blades — which also could have straight edges instead of the shown angular ones — may be varied from two and upwards. The cross link could be replaced by an other force transmitting link and the possible play be compensated in another manner than that shown, e.g. by means of a pin-and-slot connection. The arrangement for the centering can be varied in many ways. On the whole, the components shown could be replaced by other parts having equivalent functions.

What is claimed is:

1. A device for use in removal of tree stumps, comprising a vehicle-carried crane arm, a vertically extending frame supported at the end of said crane arm, a split head mounted at the lower end of said frame for limited vertical movement, chopping blades mounted at said split head and movable between a collected and radially spread position, and energy storer, as a ram, guided in the frame, first means for raising said energy storer to a starting point for, when released, producing an impact on said split head so as to sink said blades into the centre portion of the tree stump, and second means for spreading said blades to effect a breaking-up of said stump into separate portions which easily are individually removable in a direction substantially following the extension of the roots.

2. A device according to claim 1, wherein said first means for raising said energy storer is a first hydraulic jack, acting between a point on the base of the frame and a shoulder in said energy storer, said chopping blades being fixed to swing elements pivoted at the base of said split head, said second means for spreading said blades being a second hydraulic jack acting substantially vertically between a point on the split head and a lever point for said swing elements.

3. A device according to claim 2, wherein a triggering protrusion is provided at the top of said frame for releasing the engagement of said first hydraulic jack with said shoulder in said energy storer when said storer is raised to said starting point.

4. A device according to claim 1, wherein said chopping blades, when more than two, have an angle-shaped transverse section with, in the collected position of said blades, abutting angle corners along the axis of said energy storer.

5. A device according to claim 2, wherein said lever point is defined by a cross link terminating the piston rod of said second hydraulic jack and having its ends pivoted at the operative ends of the respective swing elements, the pivot points of said swing elements being oscillatory suspended for accommodation of the play of said link with respect to said pivot points of said swing members.

6. A device according to claim 1, wherein resilient supports are fixed to the chopping blades for centering of the centre of said blades to the centre of said stump.

7. A device according to claim 1, wherein a collection ring is connected to the base of the frame substantially at the level of said chopping blades and concentric therewith, said ring having edges inclined inwards and downwards to clamp said stump parts against said blades in the spread position thereof.

* * * * *